May 6, 1969     D. KELSALL     3,443,110
SCANNER HAVING ROTATING DOUBLE-SIDED REFLECTOR
Filed Nov. 2, 1966
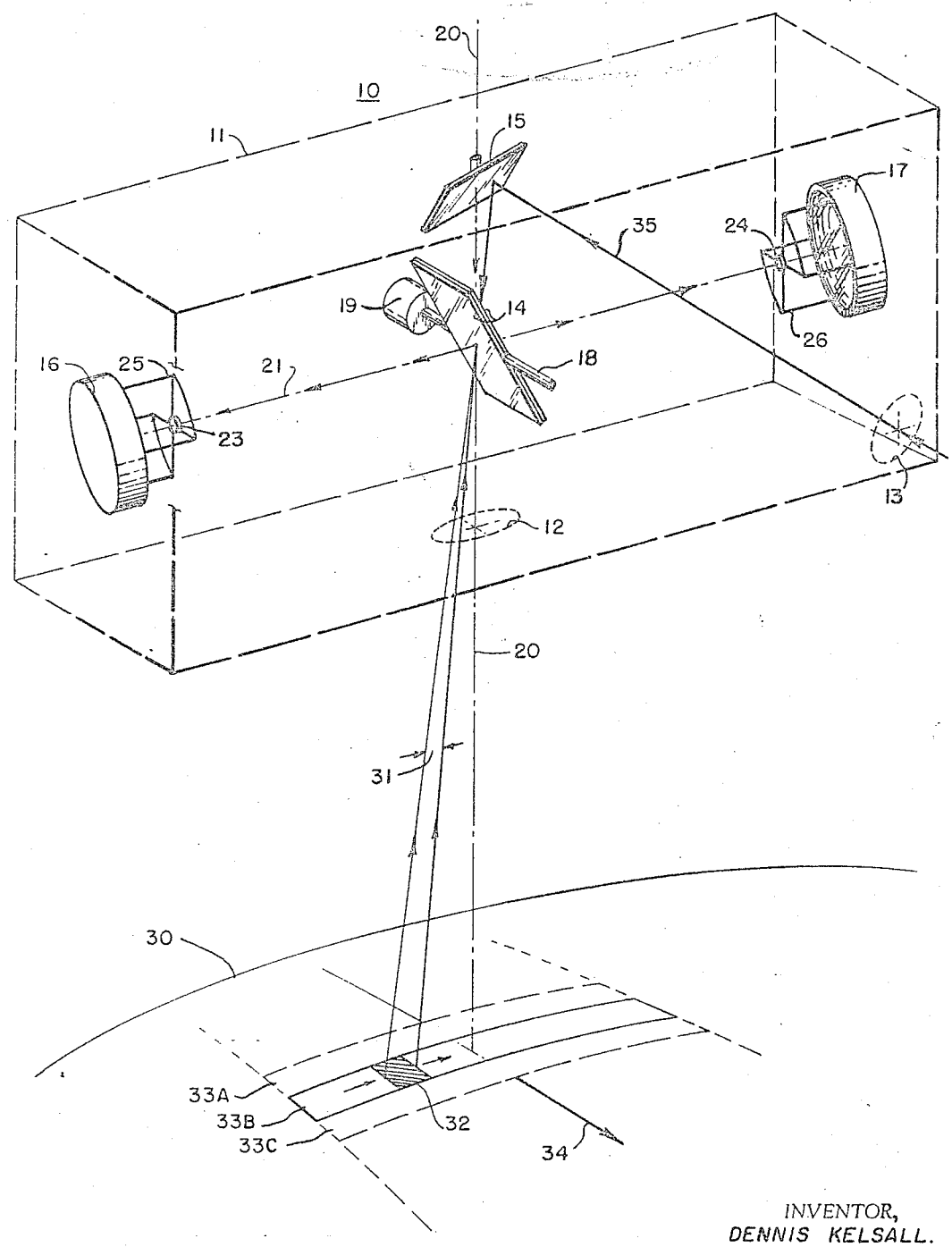
INVENTOR,
DENNIS KELSALL.
BY Harry M. Saragovitz
Edward J. Kelly, Herbert Berl
& Julian C. Keppler
ATTORNEYS 3,443,110
SCANNER HAVING ROTATING DOUBLE-SIDED REFLECTOR
Dennis Kelsall, West Concord, Mass., assignor, by mesne assignments, to the United States of America as represented by the Secretary of the Army
Filed Nov. 2, 1966, Ser. No. 591,661
Int. Cl. H01j 39/12
U.S. Cl. 250—220      4 Claims

ABSTRACT OF THE DISCLOSURE

A meteorological radiation scanning system having a rotating double sided planar reflector. A pair of radiation detectors located at the focus of different focusing reflectors are mounted on opposite sides of the axis of rotation of the planar reflector. Radiation entering the device through a pair of openings is scanned by the planar reflector to simultaneously expose the detectors to different fields of view during each cycle of revolution of the planar reflector. Twice during each cycle of revolution the detectors are autocollimated by the planar mirror.

---

The present invention relates to an optical scanning system and more particularly to a device for measuring radiation over large areas.

In the field of meteorology, it has been the general practice to employ telemeter equipped satellites carrying photographic or radiometric devices for detecting meteorological conditions such as cloud cover. The radiometric detectors have an advantage over photographic devices in that, among other things, cloud cover can be detected on the night side of the earth. Such radiometers usually require a complex scanning mechanism. Those concerned with the development of radiometers have long recognized the need for a simple scanning system that will also have a minimum amount of dead time. The present invention fulfills this need. Another critical problem confronting designers of such scanning devices is the provision of means for obtaining reference signals and detector arrangements which may be designed to operate on the null principle. These problems are also overcome by the present invention.

The general purpose of this invention is to provide a scanning device which is capable of providing simultaneously both a scanning signal and an ambient reference signal over most of the operating cycle and also providing periodically signals which auto-collimate the radiation detector back on itself. The dead time of the scanning system will be dependent only on the characteristics of the aperture provided by the satellite housing, or the like, in which the scanning mechanism is mounted. To attain the results, the present invention contemplates a unique arrangement of a rotating double sided plane mirror and a pair of radiation detectors, whereby the mirror simultaneously directs radiation from the target area into one detector and from space into the other detector for half a cycle and then alternates the detectors for the other half cycles. Each detector is autocollimated back on itself for a short period between half cycles.

An object of the present invention in the provision of a scanning system having substantially no dead time.

Another object is to provide a scanning system for a radiometer which can provide reference signals with a minimum of equipment.

A further object of the invention in the provision of a radiometer which is capable of operating on a null signal developed between at least two sources.

With these and other objects in view, as will hereinafter more fully appear, and which will be more particularly pointed out in the appended claims, reference is now made to the following description taken in connection with the accompanying drawing which shows a diagrammatic view of a preferred embodiment.

Referring now to the drawing there is shown an artificial satellite 10 having a housing 11 shown in phantom. Housing 11 has a pair of openings 12 and 13 provided therein. Mounted in housing 11 is a scanning device having a pair of plane reflectors 14 and 15, and a pair of focusing reflectors 16 and 17. The opening 12, and the mirrors 16, 17, and 15 are mounted in space quadrature about the longitudinal axis of an axle 18.

Reflector 14 is rotatably mounted in housing 11 on axle 18 which is rotated by a motor 19. Reflector 14 is mounted just above opening 12 such that the centers of both the mirror 14 and the opening 12 lie on a common axis 20 which intersects and is normal to the longitudinal axis of axle 18 and is normal to the plane of opening 12.

Mirror 15 is mounted in housing 11 just above mirror 14 such that light entering opening 13 and impinging on mirror 15 will be reflected toward mirror 14.

Focusing mirrors 16 and 17 are mounted on opposite sides of mirror 14 on an axis 21 which is perpendicular to both axis 20 and the longitudinal axis of axle 18.

At the focus of mirrors 16 and 17 are mounted detectors 23 and 24 by mounting spiders 25 and 26 respectively.

In operation as a radiometer for detecting cloud cover, the satellite 11 would be placed in an orbit around the earth 30 with a velocity which is along the longitudinal axis of axle 18. The height above the earth 30 of the satellite 11, the size of the mirrors, and the focal length of the focusing mirrors 16 and 17 are adjusted to provide a relatively small resolution angle 31, thereby exposing the detectors 23 and 24 to successive small areas 32 of the earth 30 as the mirror 14 rotates. The small areas will form strips 33 which are substantially perpendicular to the orbital subtrack 34. Of course, the strips 33 could extend to the horizon but are usually limited by the size of the opening 12 in a practical device.

As the mirror 14 scans the earth 30, the radiation emitted from alternate strips 33A, 33B and 33C along the subtrack 34 will be successively directed to mirror either 16 or 17. For example, detector 23 is presently detecting the radiation emitted from the small section 32 in strip 33B which is presently being scanned. After mirror 14 has rotated into the plane which includes axis 21, the emitted radiation from the earth 30 will be directed toward mirror 17. Therefore, the strip 33B will be scanned by detector 23 and the alternate strips 33A and 33C will be scanned by detector 24 and so on. It is pointed out that in determining cloud cover the detectors 23 and 24 would normally be infrared detectors which would measure the amount of infrared being emitted by the earth 30 due to reflections and the temperature of the earth. The amount of radiation emitted from the clouds will differ substantially from the radiation given off by the earth and oceans, and will also be different for the different types of clouds. It is these differences in emitted radiation which are used in well-known fashions to produce an image of the area scanned.

While one side of the reflector 14 is directing radiation from the Earth 30 to one of the detectors 23 or 24, the reflector 15 will be directing the ambient radiation entering opening 13 in the direction 35 onto the other side of a reflector 14 which in turn will direct this ambient radiation to the detector. The ambient radiation detected may be used as a reference signal.

The electronic network (not shown) which will record and compare these signals developed by detectors 23 and 24 may now include any of the well-known bridge type circuits which operate on the null principle, since both detectors 23 and 24 will each produce signals from Earth 30 and from space.

Further, when mirror 14 has rotated into the plane which includes axis 20, the mirror 14 will auto-collimate the detectors 23 and 24 back on themselves. These signals may be used as reference signals to calibrate the device.

Of course, the foregoing description and the drawing describe the invention only diagrammatically and various refinements which are obvious to those skilled in the art must be incorporated. Also, various modifications are contemplated and may obviously be resorted to by those skilled in the art without departing from the spirit and scope of the invention, as hereinafter defined by the appended claims, as only a preferred embodiment thereof has been disclosed.

What is claimed is:

1. A scanning device comprising a radiation reflector means; first and second radiation detector means; and means for rotating said reflector means for simultaneously scanning portions of first and second fields of view and for simultaneously exposing said first and second detector means to scanned portions of said first and second fields of view respectively during a first portion of a cycle of revolution of said reflector and for simultaneously exposing said first and second detector means to scanned portions of said second and first fields of view respectively during a second portion of a cycle of revolution of said reflector means.

2. The device according to claim 1 and wherein said reflector means during a third portion of said cycle of revolution is arranged to simultaneously auto-collimate said detector means.

3. The device according to claim 2 and further including a pair of focusing reflectors, each said detector means being mounted at the focus of a different one of said focusing reflectors.

4. A scanning device comprising a housing having first and second apertures therein, a first planar reflector mounted for rotation above said first aperture, said first reflector having reflective surfaces on both sides thereof, first and second focusing reflectors having a common focal axis, each said focusing reflector having a radiation detector means mounted at the focus points thereof, a second planar reflector mounted above said first planar reflector such that radiation entering said second aperture is directed along a third axis, said axis of rotation of said first mirror, said focal axis, and said third axis being mutually perpendicular and intersecting at said first mirror.

References Cited

UNITED STATES PATENTS 2,683,220   7/1954   Gross _____ 250—233

RALPH G. NILSON, *Primary Examiner.*

M. ABRAMSON, *Assistant Examiner.*

U.S. Cl. X.R.

250—233, 236